United States Patent
Li

(10) Patent No.: US 6,899,094 B1
(45) Date of Patent: May 31, 2005

(54) COOKING ASSEMBLY WITH A RETAINING CLIP FOR COUPLING FIRST AND SECOND TUBES THEREOF

(75) Inventor: Chung-Shuan Li, Yung-Kang (TW)

(73) Assignee: Tsann Kuen Enterprise Co., Ltd., Taipei (TW)

( * ) Notice: Subject to any disclaimer, the term of this patent is extended or adjusted under 35 U.S.C. 154(b) by 0 days.

(21) Appl. No.: 10/722,794

(22) Filed: Nov. 26, 2003

(51) Int. Cl.[7] .............................. F24C 3/14; F16L 37/08
(52) U.S. Cl. ........................ 126/41 R; 285/82; 285/321
(58) Field of Search ............................ 126/39 R, 41 R; 285/82, 319–321

(56) References Cited

U.S. PATENT DOCUMENTS

| | | | |
|---|---|---|---|
| 3,314,696 A | * | 4/1967 | Ferguson et al. ........... 285/321 |
| 4,009,896 A | * | 3/1977 | Brewer ........................ 285/305 |
| 4,478,205 A | * | 10/1984 | Koziol ....................... 126/41 R |
| 4,788,962 A | * | 12/1988 | Mashburn et al. ......... 126/41 R |
| 4,874,174 A | * | 10/1989 | Kojima et al. ................. 285/82 |
| 4,932,392 A | * | 6/1990 | Home ....................... 126/41 R |
| 5,370,527 A | * | 12/1994 | Hefling et al. ............ 126/39 R |

* cited by examiner

Primary Examiner—Sara Clarke
(74) Attorney, Agent, or Firm—Ladas & Parry LLP

(57) ABSTRACT

A cooking assembly includes a first tube formed with two diametric openings, and a second gas tube extending into the first tube and having an annular groove aligned with the openings in the first tube. A retaining clip includes a U-shaped segment disposed at one side of the first tube, two clamping segments extending respectively from two opposite ends of the U-shaped segment through the openings in the first tube and the groove in the second tube in such a manner that the clamping segments engage releasably the groove in the second tube.

9 Claims, 11 Drawing Sheets

COOKING ASSEMBLY WITH A RETAINING CLIP FOR COUPLING FIRST AND SECOND TUBES THEREOF

BACKGROUND OF THE INVENTION

1. Field of the Invention

The invention relates to a cooking assembly, more particularly to a cooking assembly with a retaining clip for coupling first and second tubes thereof.

2. Description of the Related Art

Referring to FIGS. 1 to 3, a conventional cooking assembly is shown to include a cooking device 10 formed with a first tube 11 projecting outwardly therefrom, a second tube 15 adapted to be connected to a gas supply (not shown), and a resilient clip 14.

As illustrated, the first tube 11 defines a gas passage 110 and an inlet hole 12 for access into the gas passage 110, and is formed with an annular first groove 13. The annular first groove 13 of the first tube 11 is defined by a groove-confining wall 13W that has two annular side portions 131 projecting radially and inwardly from an outer surface of the first tube 11 and an annular base portion 132 that interconnects the side portions 131 and that is formed with an opening 133 in spatial communication with the gas passage 110. The second tube 15 has a gas-discharging end 150, and is formed with an annular second groove 151 adjacent to the discharging end 150. The second tube 15 extends co-axially into the first tube 11 in such a manner that the second groove 151 in the second tube 15 is aligned with the first groove 13 in the first tube 11.

The resilient clip 14 is mounted on the first tube 11, extends transversely relative to the first and second tubes 11,15, and has a curved portion 142 engaging the first groove 13 in the first tube 11, and a straight portion 141 that extends through the second groove 151 in the second tube 15 and that engages releasably an upper portion of the second groove 151 in the second tube 15, thereby preventing removal of the second tube 15 from the first tube 11.

One disadvantage resulting from the use of the conventional cooking assembly resides in that it is relatively difficult to insert the second tube 15 into or withdraw from the first tube 11 due to the resilient clip 14.

SUMMARY OF THE INVENTION

The object of this invention is to provide a cooking assembly with a retaining clip for coupling first and second tubes so as to eliminate the occurrence of the aforesaid disadvantages of the conventional cooking assembly.

Accordingly, a cooking assembly of the present invention includes: a cooking device formed with a first tube; a gas supply formed with a second tube; a coupling unit including first and second coupling members, the first coupling member being formed with a pair of diametrically disposed openings and being formed on one of the first and second tubes, the second coupling member being formed with a retention groove and being formed on the other of the first and second tubes, the other of the first and second tubes extending co-axially into said one of the first and second tubes in such a manner that the retention groove in the other of the first and second tubes is aligned with the openings in said one of the first and second tubes; and a retaining clip extending in a first transverse direction relative to the first and second tubes, and including a U-shaped segment disposed at one side of said one of the first and second tubes, two clamping segments extending respectively from two opposite ends of the U-shaped segment in the first transverse direction through the openings in said one the first and second tubes and the retention groove in the other of the first and second tubes in such a manner that the clamping segments engage releasably the retention groove so as to prevent removal of the other of the first and second tubes from said one of the first and second tubes, and two operating segments disposed at an opposite side of said one of the first and second tubes opposite to said one side of the first and second tubes, extending respectively from the clamping segments, crossing each other, and being resiliently movable toward each other in a second transverse direction relative to the first transverse direction and the first and second tubes upon application of an external force thereto so as to move the clamping segments away from each other to disengage from the retention groove in the other of the first and second tubes, thereby permitting removal of the other of the first and second tubes from said one of the first and second tubes.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
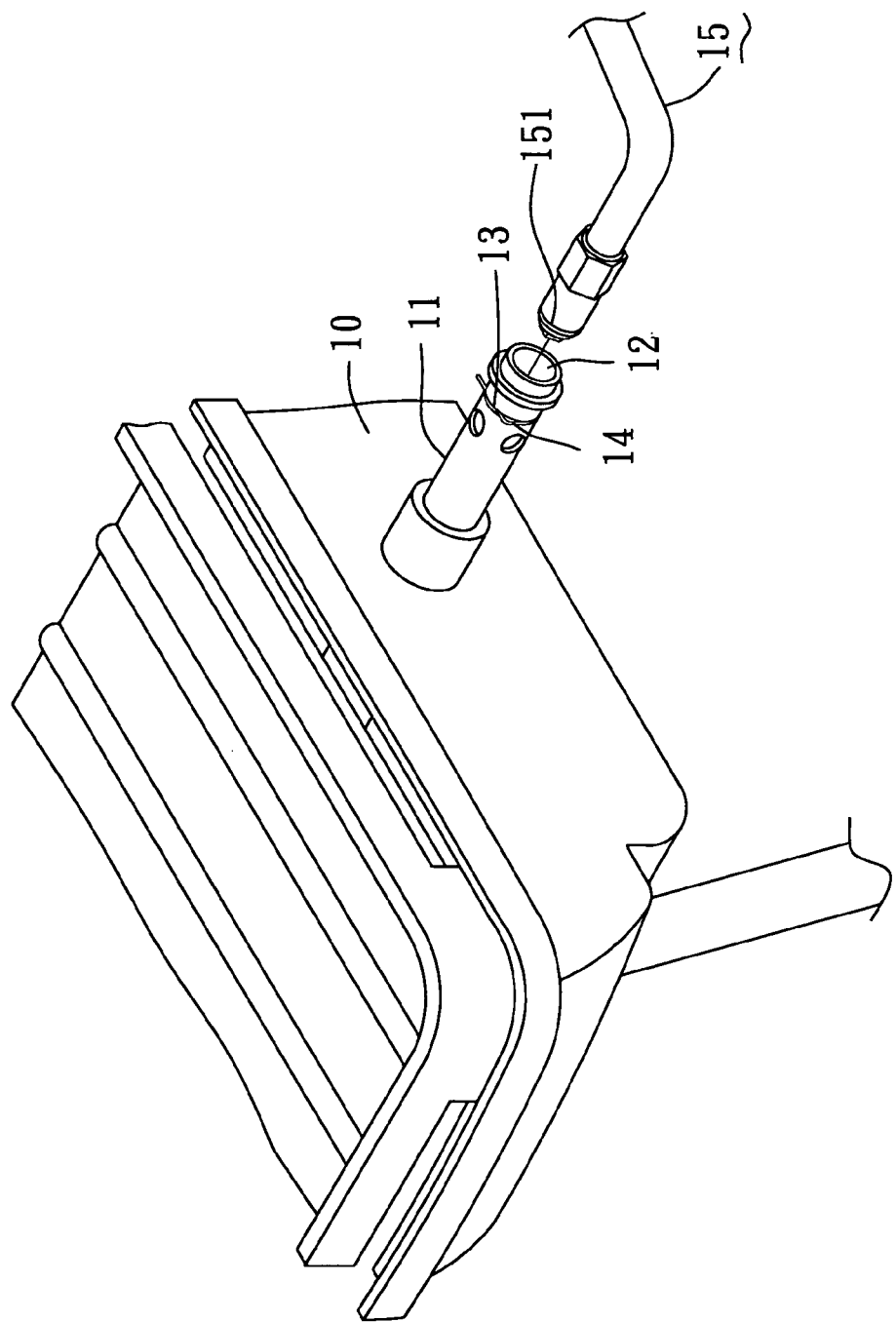
FIG. 1 is a fragmentary perspective view of a conventional cooking assembly.
Figure 2A:
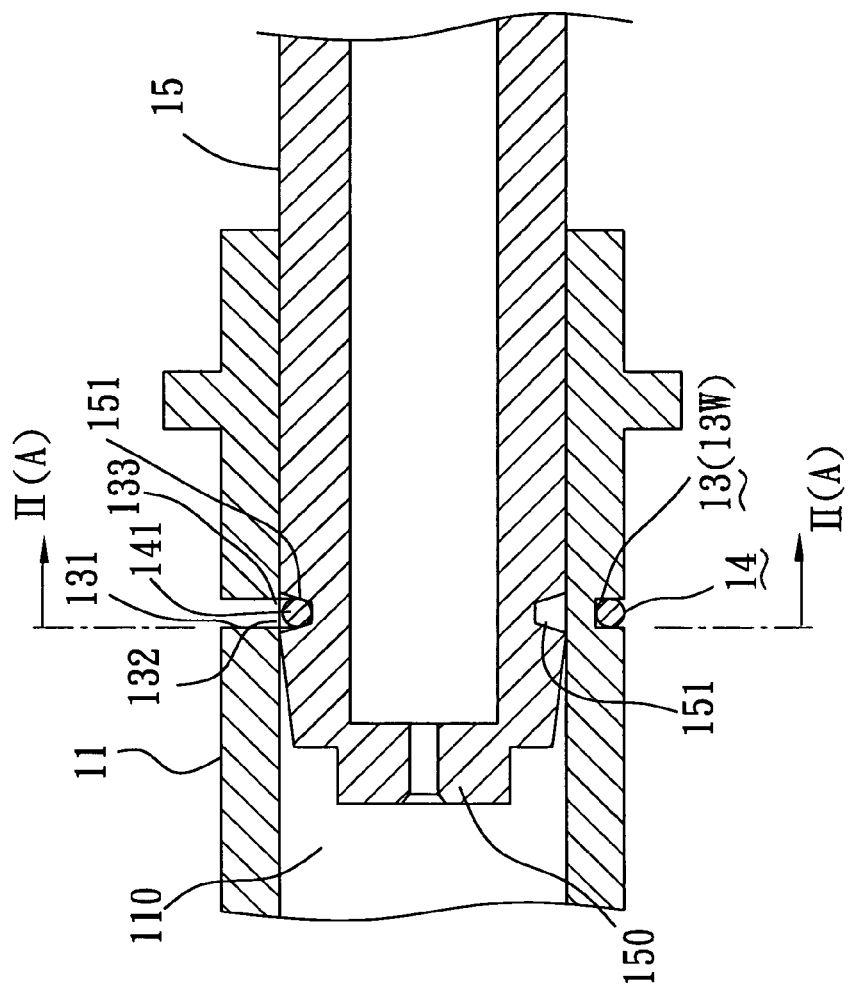
FIG. 2(A) is a fragmentary sectional view illustrating how first and second tubes are coupled together by means of a resilient clip of the conventional cooking assembly.
Figure 2B:
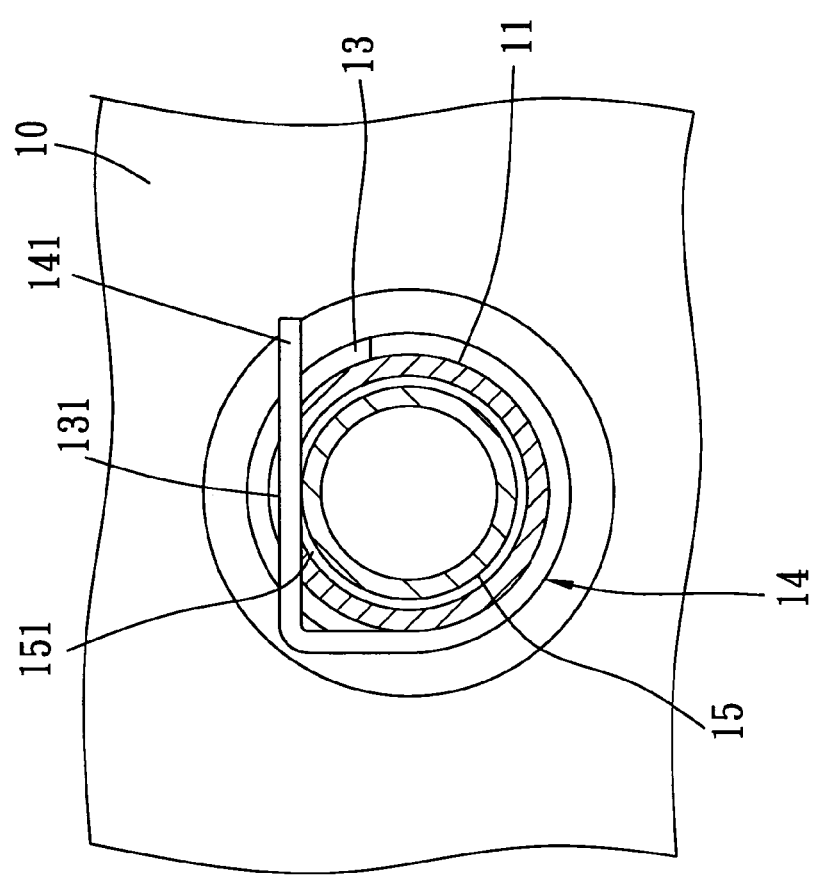
FIG. 2(B) is a fragmentary sectional view taken along lines II(A)—II(A) in FIG. 2(A), illustrating how the first and second tubes are coupled together by means of the resilient clip of the conventional cooking assembly.
Figure 3:
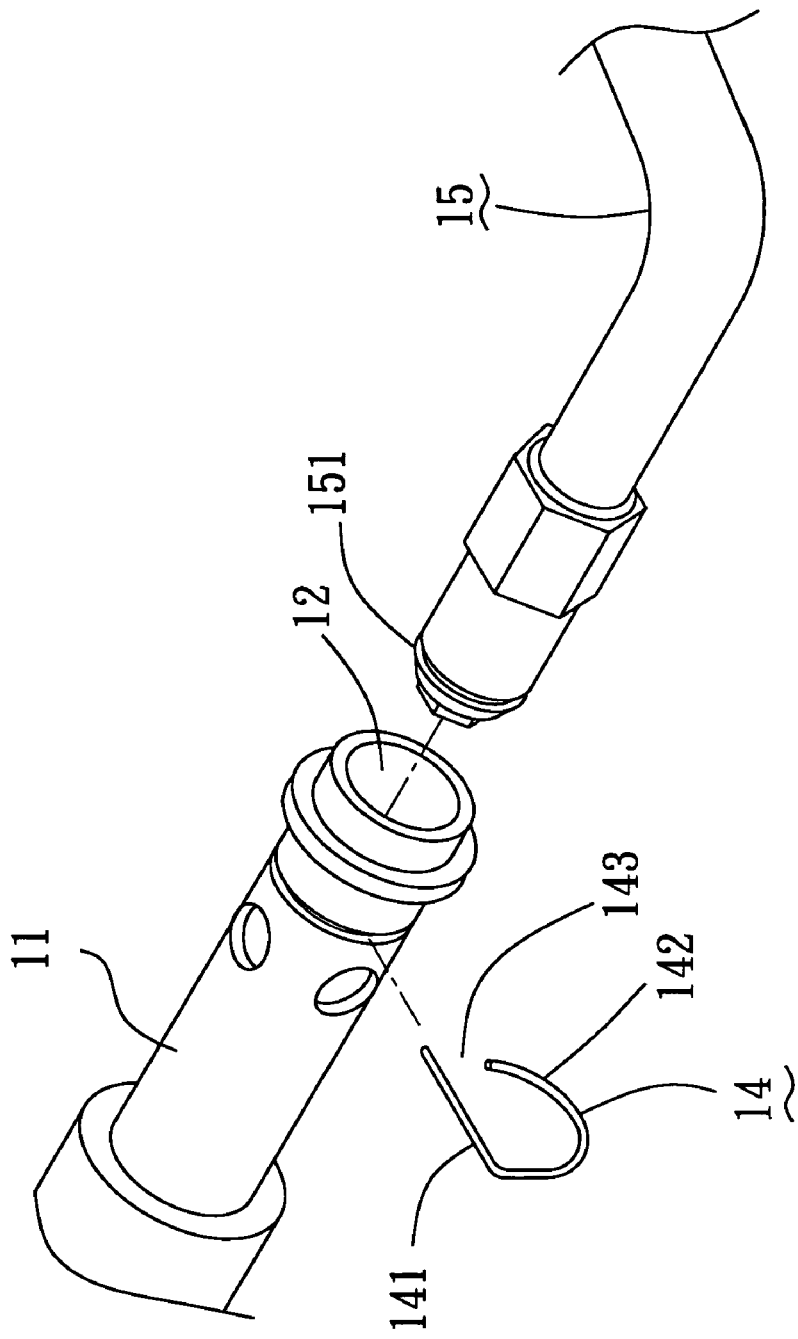
FIG. 3 is an enlarged perspective view of the first and second tubes and the resilient clip of the conventional cooking assembly.
Figure 4:
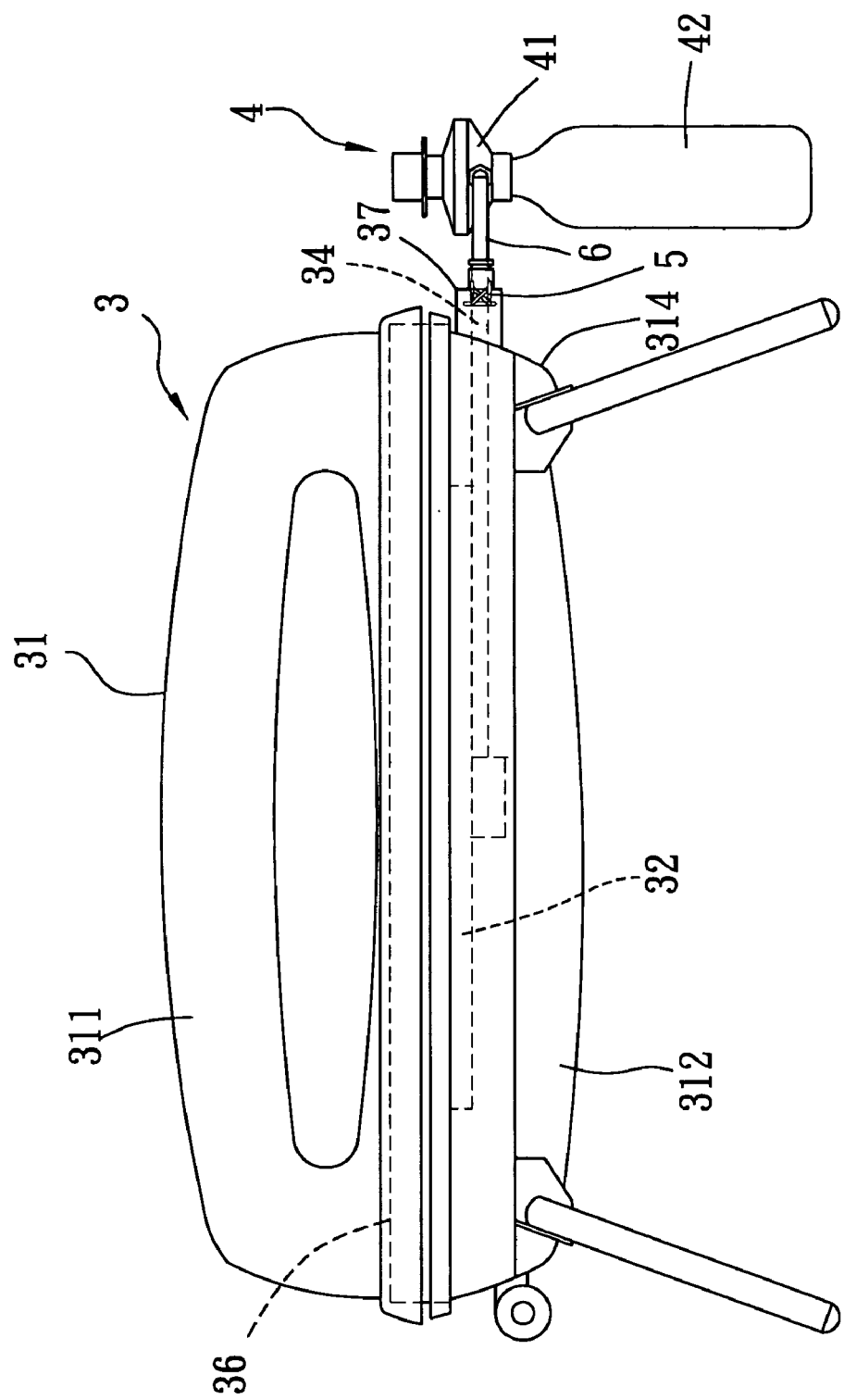
FIG. 4 is a schematic front view of the first preferred embodiment of a cooking assembly according to the present invention.
Figure 5:
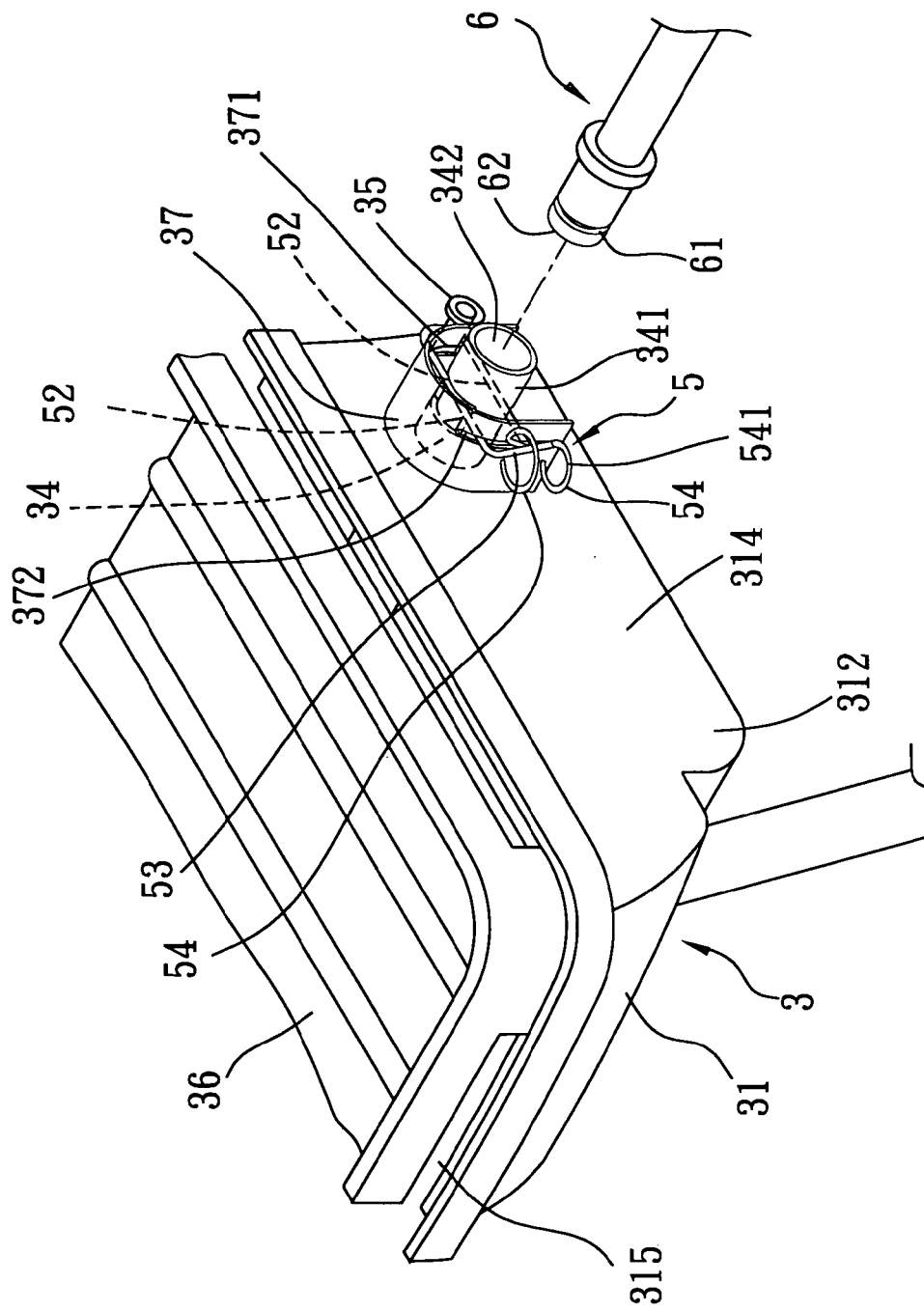
FIG. 5 is a fragmentary perspective view of the first preferred embodiment, wherein a second tube is removed therefrom to illustrate how a retaining clip is mounted on a first tube.
Figure 6:
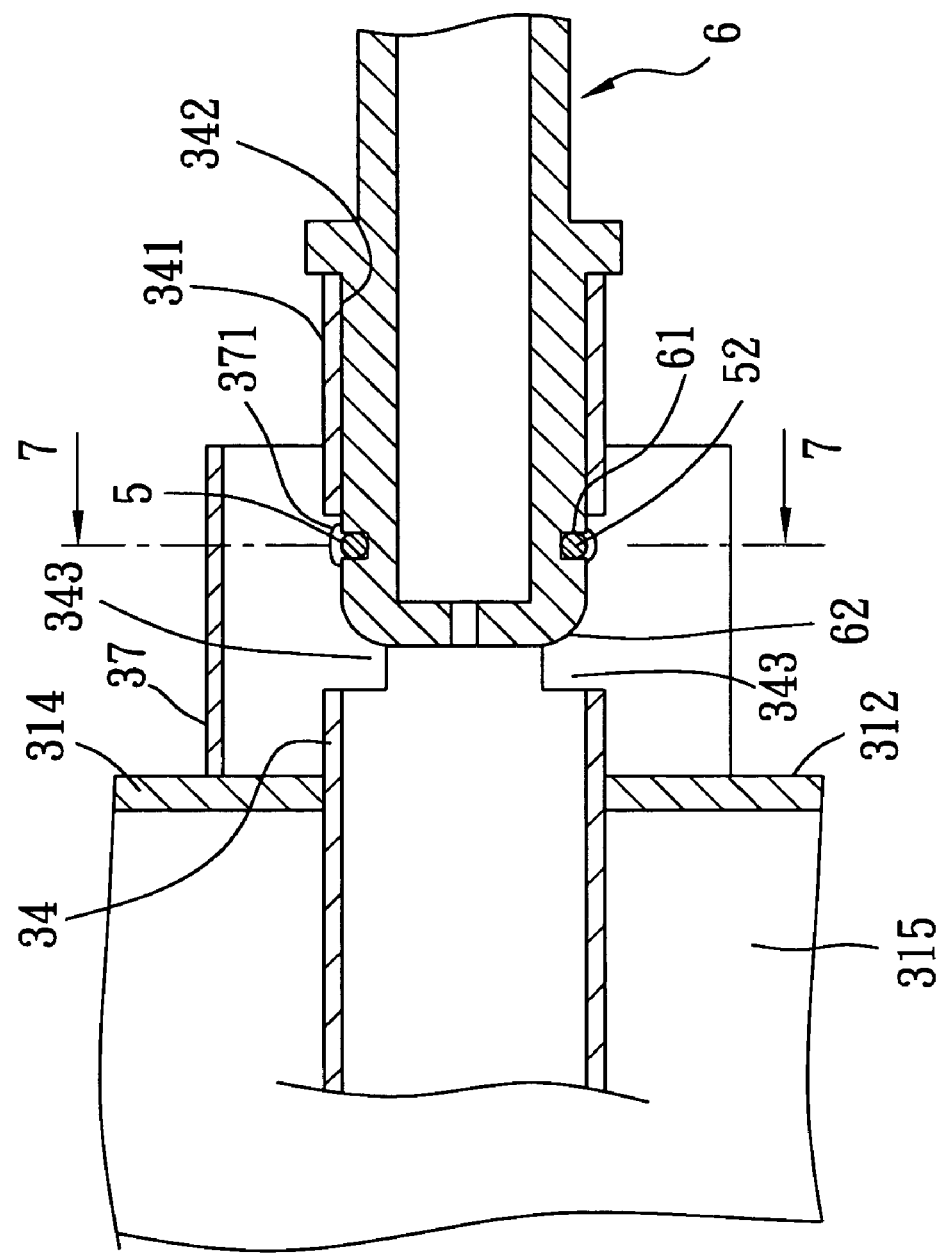
FIG. 6 is a fragmentary, sectional view illustrating how the first and second tubes are coupled together by means of the retaining clip of the first preferred embodiment.

Before the present invention is described in greater detail with reference to the following preferred embodiments, it should be noted that same reference numerals have been used to denote similar elements throughout the specification.

Referring to FIGS. 4 to 7, the first preferred embodiment of a cooking assembly according to this invention is shown to include a cooking device 3 formed with a first tube 34, a gas supply 4 having a second tube 6, a coupling unit, and a retaining clip 5.

As illustrated, the cooking device 3 may include a gas stove for cooking, grilling or baking edible food. The coupling unit includes a first coupling member 341 that is in the form of a tubular pipe, that is formed with a pair of diametrically disposed openings 343 and that is integrally formed with and that extends axially from one of the first and second tubes 34, and a second coupling member 62 that is in the form of a tubular pipe, that is formed with a retention groove 61 and that is integrally formed with and that extends axially from the other of the first and second tubes 6. The other of the first and second tubes 6 extends co-axially into said one of the first and second tubes 34 (see FIG. 6) in such a manner that the retention groove 61 in the other of the first and second tubes 6 is aligned with the openings 343 in said one of the first and second tubes 34.

The retaining clip 5 extends in a first transverse direction relative to the first and second tubes 34, 6, and includes a U-shaped segment 51, two clamping segments 52, and two operating segments 54. The U-shaped segment 51 of the retaining clip 5 is disposed at one side of said one of the first and second tubes 34 (see FIG. 7). The clamping segments 52 extend respectively from two opposite ends of the U-shaped segment 51 in the first transverse direction through the openings 343 in said one the first and second tubes 34 and the retention groove 61 in the other of the first and second tubes 6 in such a manner that the clamping segments 52 engage releasably the retention groove 61 so as to prevent removal of the other of the first and second tubes 6 from said one of the first and second tubes 34. The two operating segments 54 of the retaining clip 5 are disposed at an opposite side of said one of the first and second tubes 34 opposite to said one side of said one of the first and second tubes 34, extend respectively from the clamping segments 52, cross each other, and are resiliently movable toward each other in a second transverse direction relative to the first transverse direction and the first and second tubes 34,6 upon application of an external force thereto so as to move the clamping segments 52 away from each other to disengage from the retention groove 61 in the other of said first and second tubes 6 (see FIG. 8), thereby permitting removal of the other of the first and second tubes 6 from said one of the first and second tubes 34.

In the first preferred embodiment, the gas supply 4 is a gas can 42. The second tube 6 is connected to the gas can 42 through a flow-controlled valve 41. The retention groove 61 in the second coupling member 62 is an annular groove which has a rectangular cross-section. Alternatively, a pair of diametrically disposed retention grooves can be formed in the second coupling member 62 instead of the retention groove 61 so long as it can receive the clamping segments 52 of the retaining clip 5 so as to prevent removal of the second tube 6 from the first tube 34. The coupling member 62 has a rounded end (see FIG. 6) so as to facilitate insertion thereof through the clamping segments 52 of the retaining clip 5. The cooking device 3 preferably includes a casing 31 and an inverted U-shaped cover 37. The casing 31 includes a lower casing half 312 that defines a lower space 315 (see FIG. 5) to receive the gas stove 32 therein, and an upper casing half 311 that is connected pivotally to the lower casing half 312 for detachably covering the gas stove 32. A rack 36 is disposed above the gas stove 32 in such a manner that food can be placed on the rack 36 for cooking or grilling. The first tube 34 preferably defines a gas passage 342, is mounted on a front side 314 of the lower casing half 312, is connected to the gas stove 32, and projects outwardly from the lower casing half 312. The inverted U-shaped cover 37 is fixed to the front side 314 of the lower casing half 312, and includes an upper curved section 376 that is disposed above the first tube 34, and left and right side sections 377, 378 (see FIG. 7) that extend respectively and downwardly from two opposite ends of the upper curved section 376 and that are respectively disposed at the sides of the first tube 34. The right side section 378 of the cover 37 is disposed distal from the U-shaped segment 51 of the retaining clip 5, and is formed with an elongated guiding slot 372 that permits extension of the clamping segments 52 therethrough. The left side section 377 of the cover 37 is disposed adjacent to the U-shaped segment 51 of the retaining clip 5, and is formed with a limiting hole 371 that permits extension of the clamping segments 52 therethrough.

Figure 7:
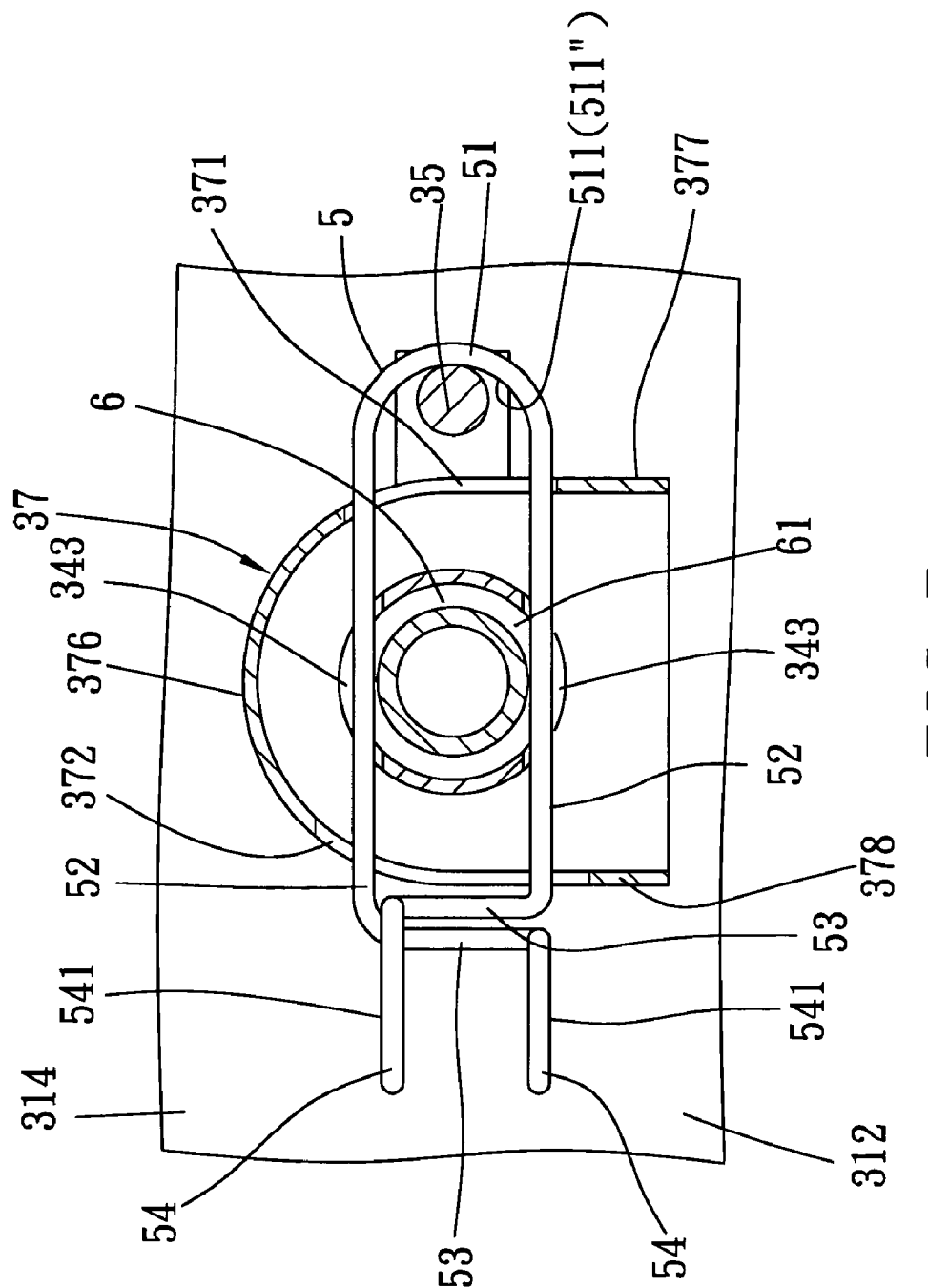
FIG. 7 is a fragmentary sectional view taken along lines VII—VII in FIG. 6, illustrating how the first and second tubes are coupled together by means of the retaining clip of the first preferred embodiment.
Figure 8:
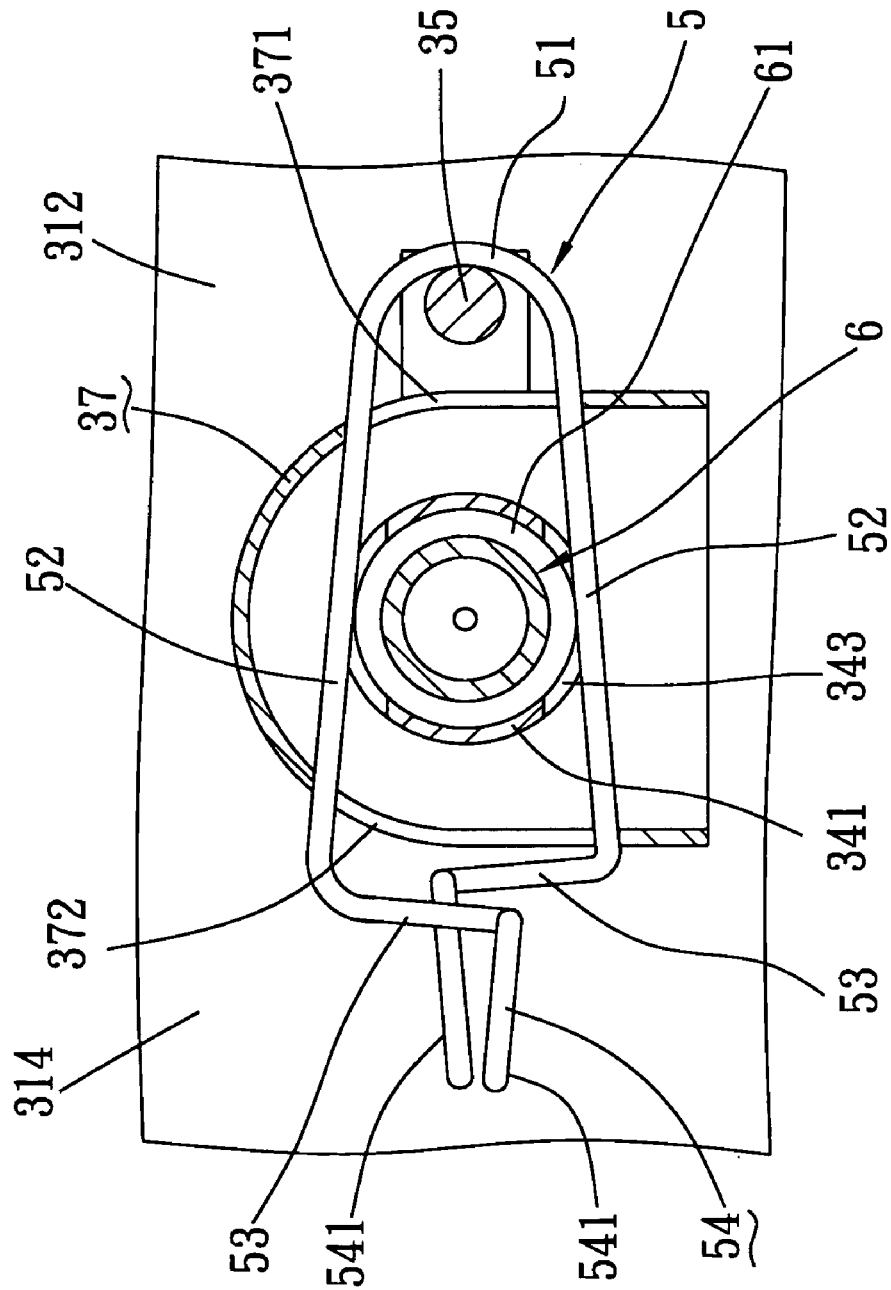
FIG. 8 is a view similar to FIG. 7, illustrating how the retaining clip of the first preferred embodiment is operated to disengage the first and second tubes, thereby permitting removal of one from the other.

The U-shaped segment 51 of the retaining clip 5 has a concave inner face 511 defining a recess 511" (see FIG. 7). The cooking device 3 further includes a positioning rod 35 that is formed on the lower casing half 312, that is parallel to the first gas tube 34, and that extends through the recess 511 defined by the U-shaped segment 51 of the retaining clip 5 in such a manner as to abut against the inner face 511 of the U-shaped segment 51 of the retaining clip 5 so as to enhance retention of the retaining clip 5 on the first tube 34.

Each of the operating segments 54 of the retaining clip 5 has a straight section 53 extending transversely from the respective clamping segment 52, and a C-shaped portion 541 that extends outwardly from the straight section 53 to facilitate holding thereof. The straight sections 53 cross each other. The C-shaped portions 541 of the operating segments 54 are parallel to the clamping segments 52 and are aligned with each other in the second transverse direction.

Figure 9:
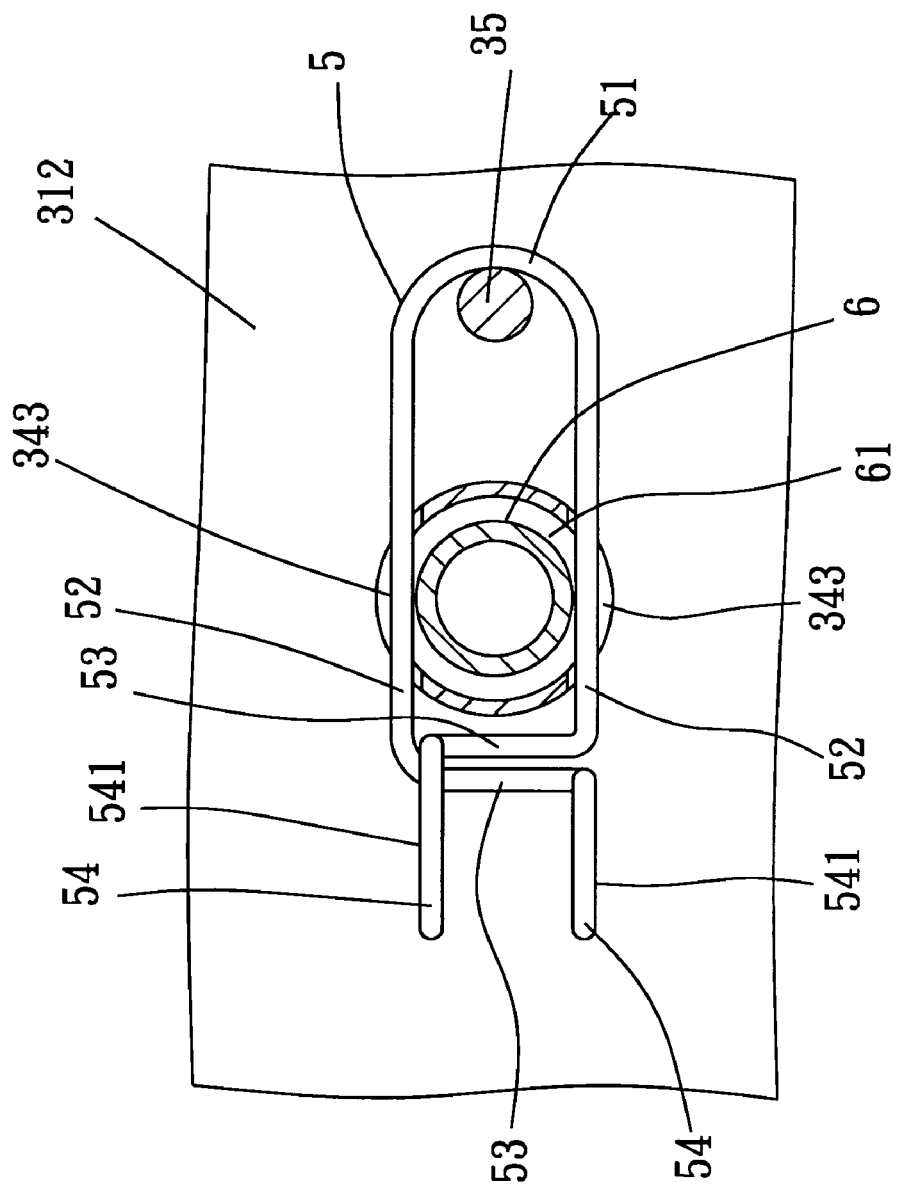
FIG. 9 is a fragmentary sectional view of the second preferred embodiment of the cooking assembly according to the present invention, illustrating how the first and second tubes are coupled together by means of the retaining clip.

Referring to FIG. 9, the second preferred embodiment of a cooking assembly according to the present invention is shown to have a construction similar to that of the previous embodiment. The main difference resides in that the inverted U-shaped cover 37 is not provided on the lower casing half 312.

Figure 10:
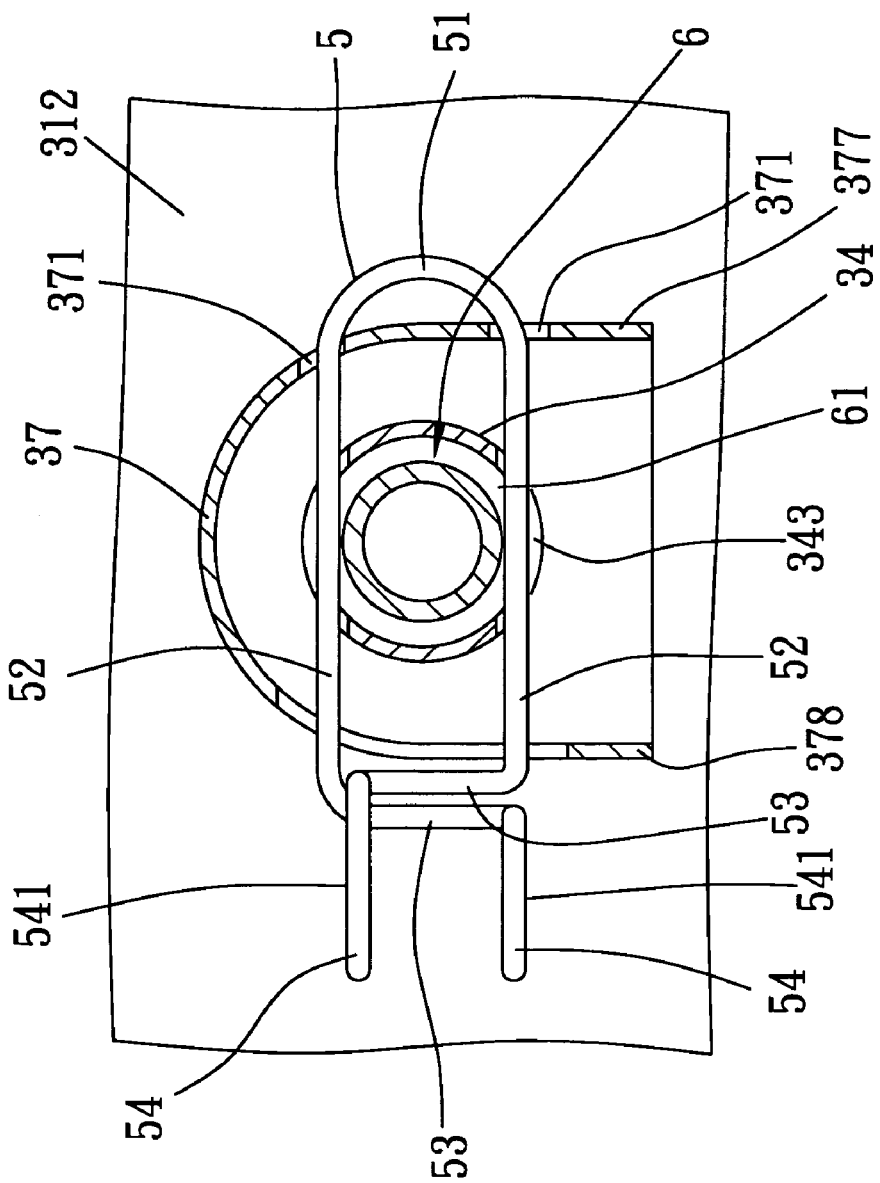
FIG. 10 is a fragmentary sectional view of the third preferred embodiment of the cooking assembly according to the present invention, illustrating how the first and second tubes are coupled together by means of the retaining clip.

Referring to FIG. 10, the third preferred embodiment of a cooking assembly according to the present invention is shown to have a construction similar to that of the first preferred embodiment. The main difference resides in that the positioning rod 35 (see FIG. 5) is not provided on the lower casing half 312 and that the left side section 377 of the cover 37 is formed with a pair of spaced-apart limiting holes 371 that respectively permit extension of the clamping segments 52 therethrough so as to prevent untimely removal of the retaining clip 5 from the cover 37.

With this invention thus explained, it is apparent that numerous modifications and variations can be made without departing from the scope and spirit of this invention. It is therefore intended that this invention be limited only as indicated in the appended claims.

I claim:
1. A cooking assembly comprising:
   a cooking device formed with a first tube;
   a gas supply formed with a second tube;

a coupling unit including first and second coupling members, said first coupling member being formed with a pair of diametrically disposed openings and being formed on one of said first and second tubes, said second coupling member being formed with a retention groove and being formed on the other of said first and second tubes, the other of said first and second tubes extending co-axially into said one of said first and second tubes in such a manner that said retention groove in the other of said first and second tubes is aligned with said openings in said one of said first and second tubes; and a retaining clip extending in a first transverse direction relative to said first and second tubes, and including a U-shaped segment disposed at one side of said one of said first and second tubes, two clamping segments extending respectively from two opposite ends of said U-shaped segment in said first transverse direction through said openings in said first coupling member and said retention groove in said second coupling member in such a manner that said clamping segments engage releasably said retention groove so as to prevent removal of the other of said first and second tubes from said one of said first and second tubes, and two operating segments disposed at an opposite side of said one of said first and second tubes opposite to said one side of said one of said first and second tubes, extending respectively from said clamping segments, crossing each other, and resiliently movable toward each other in a second transverse direction relative to said first transverse direction and said first and second tubes upon application of an external force thereto so as to move said clamping segments away from each other to disengage from said retention groove, thereby permitting removal of the other of said first and second tubes from said one of said first and second tubes;

wherein said cooking device includes a casing and an inverted U-shaped cover, said one of said first and second tubes projecting outwardly from said casing, said inverted U-shaped cover being fixed to said casing, and having an upper curved section disposed above said one of said first and second tubes, and left and right side sections extending respectively and downwardly from two opposite ends of said upper curved section and disposed at said sides of said one of said first and second tubes, said right side section being distal from said U-shaped segment of said retaining clip and being formed with an elongated guiding slot that permits extension of said clamping segments therethrough, said left side section being disposed adjacent to said U-shaped segment of said retaining clip and being formed with two spaced-apart limiting holes that respectively permit extension of said clamping segments therethrough so as to prevent untimely removal of said retaining clip from said cover.

2. The cooking assembly as defined in claim 1, wherein each of said operating segments of said retaining clip has a C-shaped portion, said C-shaped portions of said operating segments being parallel to said clamping segments and being aligned with each other in said second transverse direction.

3. The cooking assembly as defined in claim 1, wherein said second coupling member has a rounded end so as to facilitate insertion thereof through said clamping segments of said retaining clip.

4. The cooking assembly as defined in claim 1, wherein said retention groove in said second coupling member has a rectangular cross-section.

5. A cooking assembly comprising:

a cooking device formed with a first tube;

a gas supply formed with a second tube;

a coupling unit including first and second coupling members, said first coupling member being formed with a pair of diametrically disposed openings and being formed on one of said first and second tubes, said second coupling member being formed with a retention groove and being formed on the other of said first and second tubes, the other of said first and second tubes extending co-axially into said one of said first and second tubes in such a manner that said retention groove in the other of said first and second tubes is aligned with said openings in said one of said first and second tubes; and a retaining clip extending in a first transverse direction relative to said first and second tubes, and including a U-shaped segment disposed at one side of said one of said first and second tubes, two clamping segments extending respectively from two opposite ends of said U-shaped segment in said first transverse direction through said openings in said first coupling member and said retention groove in said second coupling member in such a manner that said clamping segments engage releasably said retention groove so as to prevent removal of the other of said first and second tubes from said one of said first and second tubes, and two operating segments disposed at an opposite side of said one of said first and second tubes opposite to said one side of said one of said first and second tubes, extending respectively from said clamping segments, crossing each other, and resiliently movable toward each other in a second transverse direction relative to said first transverse direction and said first and second tubes upon application of an external force thereto so as to move said clamping segments away from each other to disengage from said retention groove, thereby permitting removal of the other of said first and second tubes from said one of said first and second tubes;

wherein said U-shaped segment of said retaining clip has a concave inner face defining a recess, said cooking device further including a casing and a positioning rod that is formed on said casing, that is parallel to said one of said first and second tubes, and that extends through said recess defined by said U-shaped segment in such a manner as to abut against said inner face of said U-shaped segment of said retaining clip so as to enhance retention of said retaining clip on said one of said first and second tubes.

6. The cooking assembly as defined in claim 5, wherein each of said operating segments of said retaining clip has a C-shaped portion, said C-shaped portions of said operating segments being parallel to said clamping segments and being aligned with each other in said second transverse direction.

7. The cooking assembly as defined in claim 5, wherein said second coupling member has a rounded end so as to facilitate insertion thereof through said clamping segments of said retaining clip.

8. The cooking assembly as defined in claim 5, wherein said retention groove in said second coupling member has a rectangular cross-section.

9. A cooking assembly comprising:

a cooking device formed with a first tube;

a gas supply formed with a second tube;

a coupling unit including first and second coupling members, said first coupling member being formed with a pair of diametrically disposed openings and being formed on one of said first and second tubes, said second coupling member being formed with a retention groove and being formed on the other of said first and second tubes, the other of said first and second tubes extending co-axially into said one of said first and second tubes in such a manner that said retention groove in the other of said first and second tubes is aligned with said openings in said one of said first and second tubes; and a retaining clip extending in a first transverse direction relative to said first and second tubes, and including a U-shaped segment disposed at one side of said one of said first and second tubes and having a concave inner face defining a recess, two clamping segments extending respectively from two opposite ends of said U-shaped segment in said first transverse direction through said openings in said first coupling member and said retention groove in said second coupling member in such a manner that said clamping segments engage releasably said retention groove so as to prevent removal of the other of said first and second tubes from said one of said first and second tubes, and two operating segments disposed at an opposite side of said one of said first and second tubes opposite to said one side of said one of said first and second tubes, extending respectively from said clamping segments, crossing each other, and resiliently movable toward each other in a second transverse direction relative to said first transverse direction and said first and second tubes upon application of an external force thereto so as to move said clamping segments away from each other to disengage from said retention groove in the other of said first and second tubes, thereby permitting removal of the other of said first and second tubes from said one of said first and second tubes;

wherein said cooking device including a casing, an inverted U-shaped cover and a positioning rod, said one of said first and second tubes projecting outwardly from said casing, said inverted U-shaped cover being fixed to said casing, and having an upper curved section disposed above said one of said first and second tubes, and left and right side sections extending respectively and downwardly from two opposite ends of said upper curved section and disposed at said sides of said one of said first and second tubes, said right side section being distal from said U-shaped segment of said retaining clip and being formed with an elongated guiding slot that permits extension of said clamping segments therethrough, said left side section being disposed adjacent to said U-shaped segment of said retaining clip and being formed with a limiting hole that permits extension of said clamping segments therethrough, said positioning rod being formed on said casing, being parallel to said one of said first and second tubes, and extending through said recess defined by said U-shaped segment in such a manner as to abut against said inner face of said U-shaped segment of said retaining clip so as to enhance retention of said retaining clip on said one of said first and second tubes.

* * * * *